(12) United States Patent
Ismert et al.

(10) Patent No.: US 7,549,613 B1
(45) Date of Patent: Jun. 23, 2009

(54) TUBE CLAMP FOR AN ANGLE BRACKET

(75) Inventors: Joseph P. Ismert, Kansas City, MO (US); Frank D. Julian, Kansas City, MO (US); Truman J. Stegmaier, Lee's Summit, MO (US)

(73) Assignee: Sioux Chief Mfg. Co., Inc., Peculiar, MO (US)

( * ) Notice: Subject to any disclaimer, the term of this patent is extended or adjusted under 35 U.S.C. 154(b) by 0 days.

(21) Appl. No.: 11/859,855

(22) Filed: Sep. 24, 2007

(51) Int. Cl.
*F16L 3/00* (2006.01)
(52) U.S. Cl. ........................................... 248/73
(58) Field of Classification Search ................... 248/73, 248/74.1, 74.2, 74.3, 229.16, 229.26
See application file for complete search history.

(56) References Cited

U.S. PATENT DOCUMENTS

| | | | |
|---|---|---|---|
| 3,180,597 | A | 4/1965 | Havener |
| 3,874,035 | A | 4/1975 | Schuplin |
| 4,369,945 | A | 1/1983 | Mantoan et al. |
| 5,024,405 | A | 6/1991 | McGuire |
| 5,154,375 | A | 10/1992 | Condon |
| 5,230,488 | A | 7/1993 | Condon |
| 5,236,158 | A | 8/1993 | Condon |
| 5,267,710 | A | 12/1993 | Condon |
| 5,351,920 | A | 10/1994 | Deckey et al. |
| 6,631,876 | B1 | 10/2003 | Phillips |
| 7,201,352 | B2 * | 4/2007 | Kawai ........................ 248/74.1 |
| 7,219,931 | B2 * | 5/2007 | Kato ............................ 285/61 |
| 7,297,874 | B2 * | 11/2007 | Yasuda et al. ................ 174/154 |
| 2003/0213876 | A1 * | 11/2003 | Takeuchi ....................... 248/71 |
| 2004/0026577 | A1 | 2/2004 | Yasuda et al. |
| 2006/0180718 | A1 * | 8/2006 | Harrison ..................... 248/74.2 |

FOREIGN PATENT DOCUMENTS

JP 2000-120936 4/2000

OTHER PUBLICATIONS

Advertising materials of Hubbard Enterprises showing Holdrite #251 Rapid Clamp, believed to have been on sale for less than one year prior to the filing date of the present application.

* cited by examiner

*Primary Examiner*—Ramon O Ramirez
(74) *Attorney, Agent, or Firm*—Erickson, Kernell, Derusseau & Kleypas, LLC (57) ABSTRACT

A clamp for mounting a tube to an angle bracket includes a primary mounting platform having a split ring mounted thereon for receiving the tube. First and second clips extend outwardly from the primary mounting platform. The first clip receives the edge of a first bracket flange and the second clip extends across the other bracket flange and engage the edge thereof. A lever arm extends outwardly from the split ring and a secondary mounting platform is formed on the lever arm. Third and fourth clips extend outwardly from the secondary mounting platform. The third clip is engages the edge of the first bracket flange and the fourth clip extends across the other bracket flange and engage its edge. Both the third and fourth clips include barbs so that the secondary mounting platform can be snapped onto the bracket to cinch the split ring around the tube.

23 Claims, 8 Drawing Sheets

TUBE CLAMP FOR AN ANGLE BRACKET

BACKGROUND OF THE INVENTION

1. Field of the Invention

This invention relates to clamps for fastening tubes to brackets, and in particular to a snap-on clamp for fastening a tube to an angle bracket.

2. Description of the Related Art

It is known to provide a clamp for attaching a tube, such as a plumbing pipe, to a metal bracket. Preferably, these clamps are "snap-on" or "clip-on" type clamps which do not need screws or other fasteners to mount them on the bracket. For example, U.S. Pat. No. 5,230,488 discloses a clip-on pipe hanging clamp for attaching a pipe to a flat metal bracket such as a HYCO strap. The clamp includes a split cylindrical clamp portion, a rectangular mounting platform and an arm that extends from the clamp portion. The platform has a centrally located peg which is inserted into a selected hole in the strap. The platform is then twisted on the strap to engage L-shaped flanges on opposite corners of the platform with opposite side edges of the strap. The arm is then pushed up over the strap to engage a hook member on the outer end of the arm with a strap edge. The resulting spring force urges the hook member downwardly to cinch the pipe inside the clamp portion and anchor the clamp and pipe relative to the strap.

Angle brackets, such as right angle brackets having a pair of longitudinal bracket flanges oriented at 90 degrees to each other, are often used to support plumbing pipes and other tubes. These angle brackets have the advantage of being substantially more rigid than flat brackets and allow tubes to be mounted in two planes instead of just one. Tubes are generally attached to angle brackets using screw-on clamps or fittings such as drop ear elbows. Previous clip-on or snap-on clamps, such as the clamp disclosed by the '488 patent, cannot be used on an angle bracket. What is needed is a snap-on or clip on type clamp which can be used to attach a tube to an angle bracket such as a right angle bracket.

SUMMARY OF THE INVENTION

The present invention comprises a snap-on clamp for mounting a tube, such as a plumbing pipe, to an angle bracket having a pair of longitudinal bracket flanges. The clamp includes a primary mounting platform having a split ring mounted thereon for receiving the tube. The clamp may be mounted with the primary mounting platform seated against either flange of the angle bracket. First and second clips extend outwardly from the primary mounting platform for mounting the primary platform on the angle bracket. The first clip is a short clip sized to receive the outer edge of the bracket flange against which the primary mounting platform is to be mounted. The second clip is a long clip sized to extend across the outer face of the other bracket flange and engage the outer edge thereof by means of a barb which allows it to be snapped over the respective bracket flange edge.

A lever arm extends outwardly from the split ring and a secondary mounting platform is formed on the lever arm proximate its distal end. Third and fourth clips extending outwardly from the secondary mounting platform. The third clip is a short clip sized to receive the outer edge of the bracket flange against which the primary mounting platform is to be mounted, and the fourth clip is a long clip sized to extend across the outer face of the other bracket flange and engage its outer edge. Both the third and fourth clips include barbs so that the secondary mounting platform can be snapped onto the bracket.

The clamp is mounted on the bracket by first inserting an edge of one of the bracket flanges into the first clip on the primary mounting platform. The barb on the second clip can then be snapped over the edge of the other bracket flange to secure the primary mounting platform to the bracket. The tube may then be inserted through the split ring. The secondary mounting platform is then fastened to the bracket by pressing inwardly on the lever arm near the distal end, thereby causing the barbs on the third and fourth clips to snap over the edges of the bracket flanges to secure the secondary mounting platform to the bracket, and simultaneously to reduce the diameter of the split ring to cinch the split ring around the tube.

DETAILED DESCRIPTION OF THE PREFERRED EMBODIMENTS

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Figure 1:
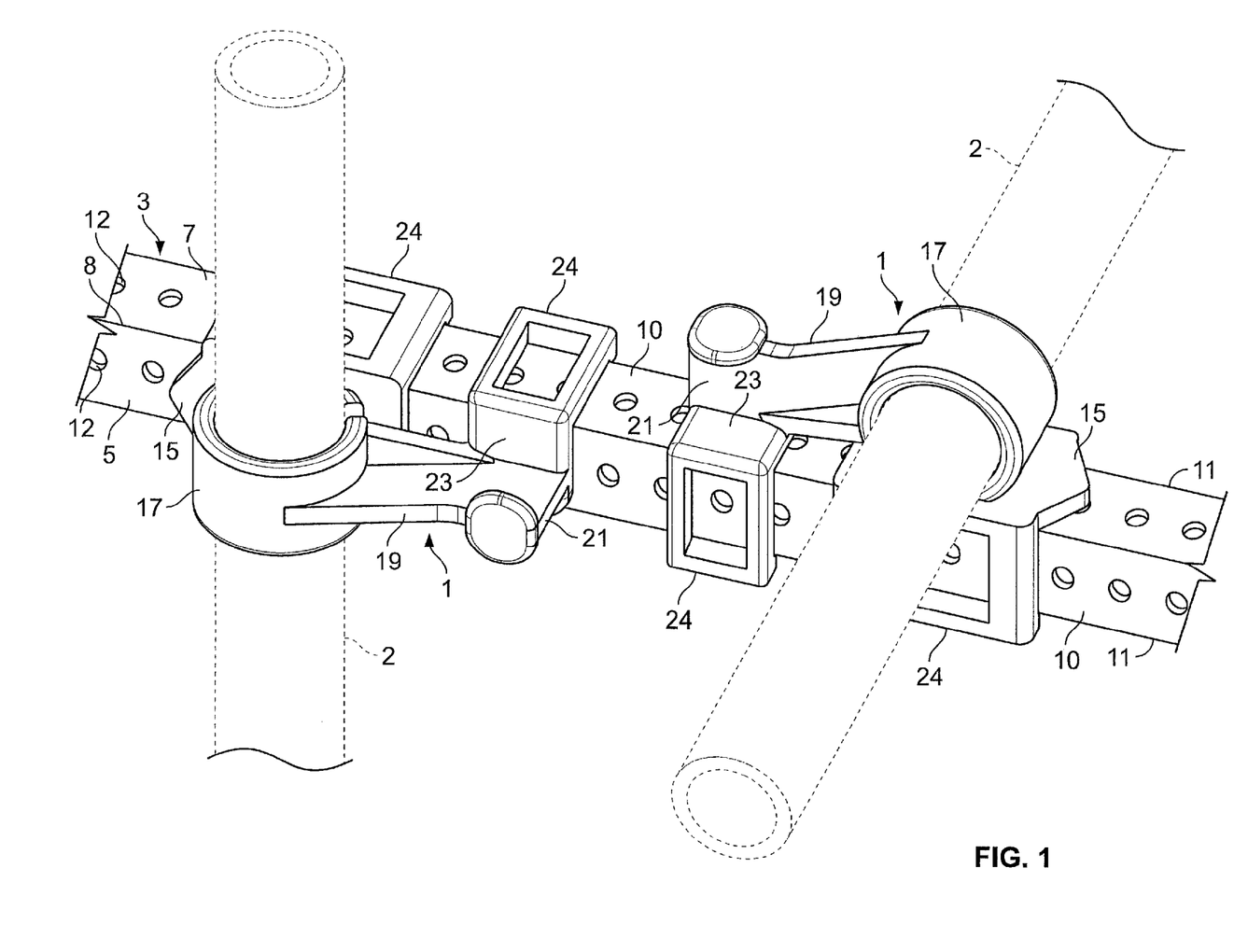
FIG. 1 is a perspective view showing a pair of clamps according to the present invention mounted on an angle bracket. On the left side of the drawing a first clamp is mounted in a first position with a primary mounting platform of the clamp against a first flange of the bracket. On the right side of the drawing a second clamp is mounted in a second position with a primary mounting platform of the clamp against a second flange of the bracket.
Figure 2:
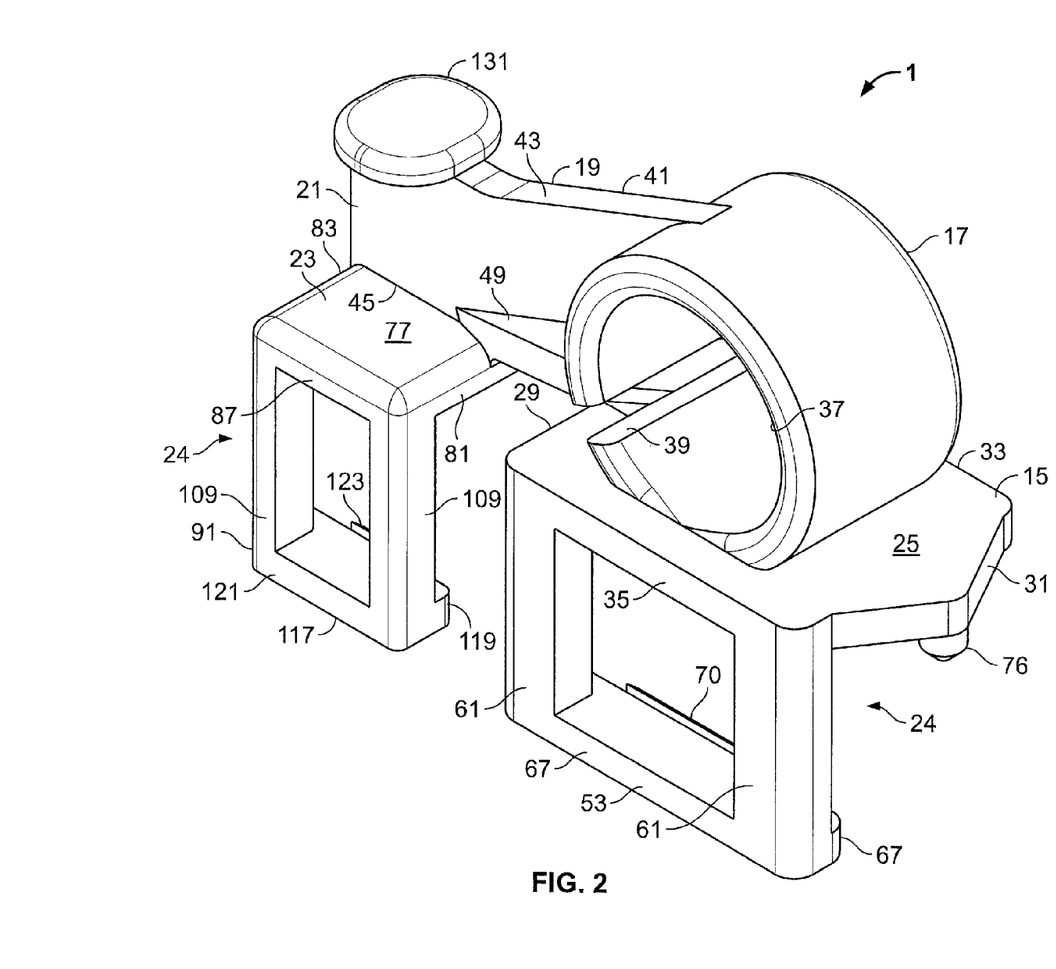
FIG. 2 is a perspective view of a clamp according to the present invention.
Figure 3:
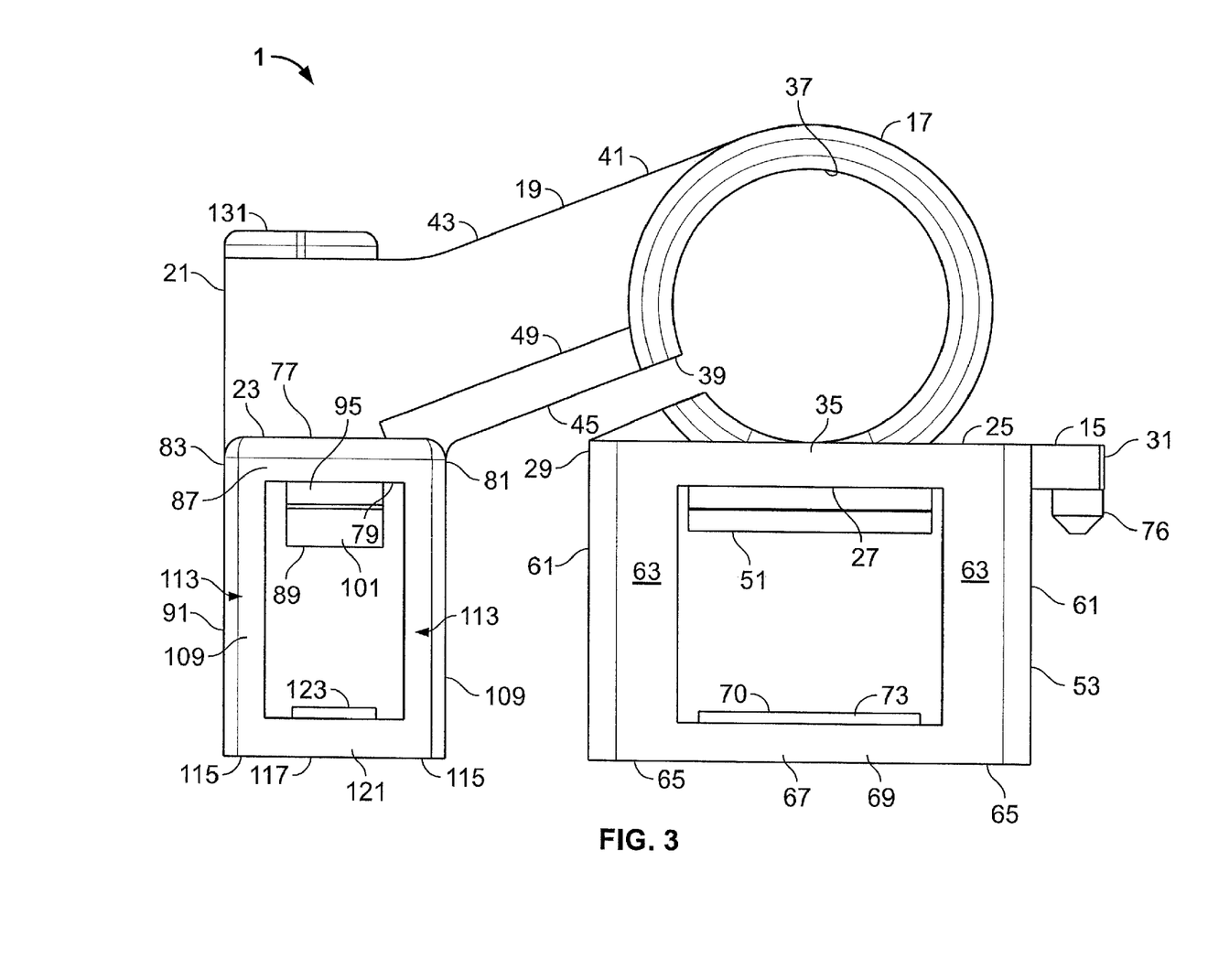
FIG. 3 is a front elevational view of the clamp of FIG. 2.
Figure 4:
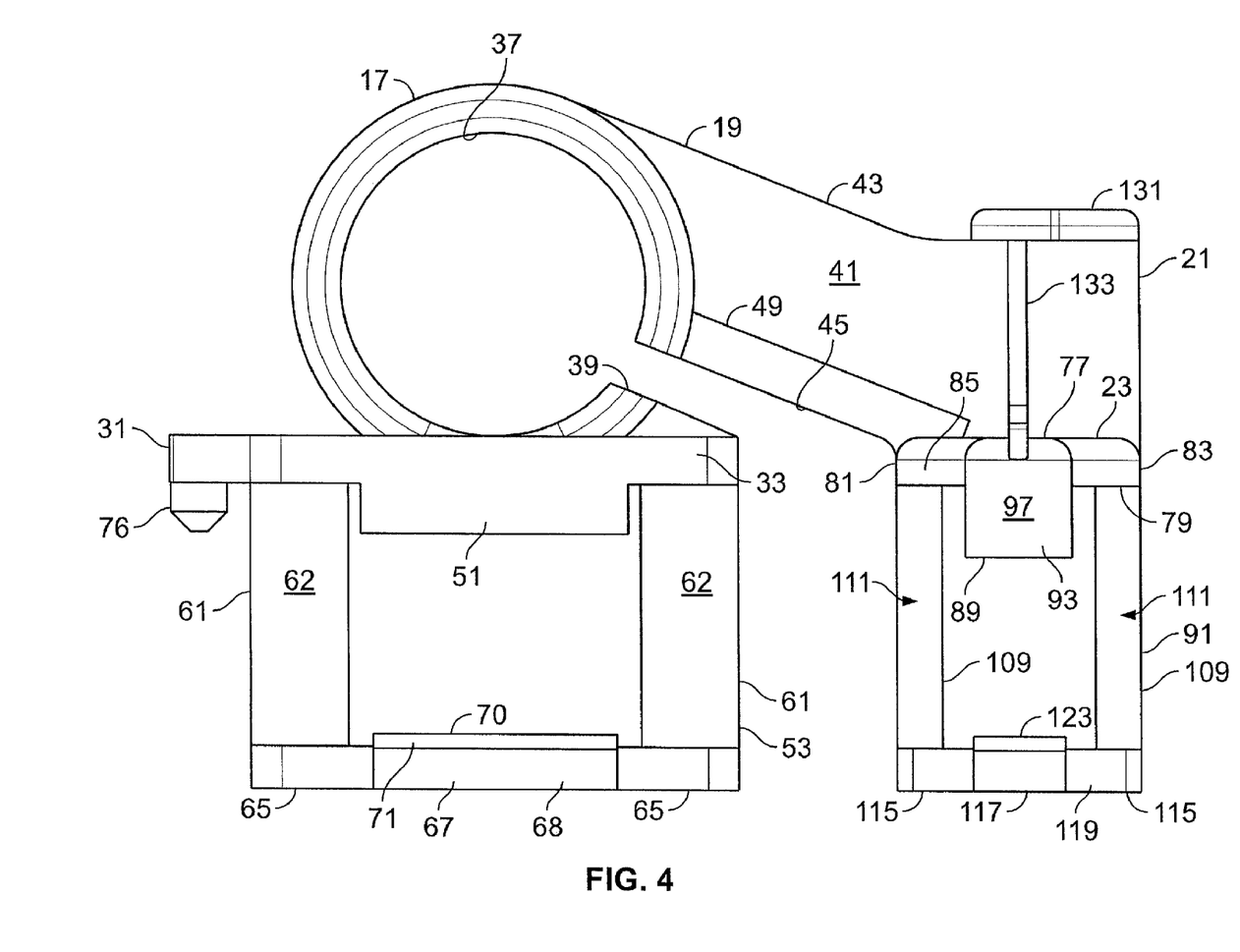
FIG. 4 is a rear elevational view of the clamp of FIG. 2.

Referring to the drawings in more detail, and in particular to FIG. 1, the reference number 1 generally designates a tube clamp according to the present invention which serves to fasten a tube 2 to a right angle bracket 3 having first and second longitudinal bracket flanges 5 and 7, respectively, connected at a juncture 8 and set apart at approximately 90 degrees. Each of the bracket flange 5 and 7 includes an outer face 10 and an outer edge 11. The bracket flanges 5 and 7 may each also include respective rows of holes 12 extending longitudinally between opposite ends of the bracket 3. A suitable bracket 3 is the Edge™ bracket sold by Sioux Chief Mfg. Co., Inc. of Peculiar Mo. This steel plumbing support bracket 3 is available in lengths selected to fit between adjacent building members on standard sixteen or twenty four inch centers and has respective pairs of bendable mounting tabs (not shown) on each end for connecting the bracket 3 to the building members.

As used herein, the word "tube" is intended to include plumbing pipe and tubing of any diameter or material, whether rigid or flexible, as well as electrical conduit and cable. The tube 2 may be, for example, a ½ inch CTS (Copper Tube Size) pipe having a ⅝ inch outside diameter. It is to be understood, however that the invention is not to be limited to use with tubes of this particular diameter, or to CTS pipe in general, as the invention has application to other sizes and types of tube including, but not limited to, IPS (Iron Pipe Size) pipe of varying diameters, electrical conduit and cable.

The clamp 1 may be integrally molded from a relatively strong plastic such as PVC (polyvinyl chloride) or ABS (acrylonitrile butadiene styrene) and includes a primary mounting platform 15, a split ring 17 connected to the primary mounting platform 15, and a lever arm 19 which extends outwardly from the split ring 17. The lever arm 19 has a distal end 21 having a secondary mounting platform 23 mounted thereon. Each of the mounting platforms 15 and 23 has mounting structure 24 thereon (to be described in detail below) for fastening the respective platform to the bracket 3.

The primary mounting platform 15 is connectable to the bracket 3 in either a first position (shown on the left side of FIG. 1) wherein the primary mounting platform 15 is seated against the outer face 10 of the first bracket flange 5, or a second position (shown on the right side of FIG. 1) wherein the primary mounting platform 15 is seated against the outer face 10 of the second bracket flange 7. When the primary mounting platform 15 is connected to the bracket 3 in either the first or second position, a tube 2 may be inserted through the split ring 17. When the secondary mounting platform 23 it then connected to the bracket 3, the lever arm 19 transfers torque to the split ring 17 thereby cinching the tube 2 and fixing the position of the tube 2 relative to the bracket 3.

Looking at the clamp 1 in more detail and referring to FIGS. 2-8, the primary mounting platform 15 includes generally planar upper and lower faces 25 and 27, inner and outer edges 29 and 31, and first and second side edges 33 and 35. The generally cylindrical split ring 17 extends outwardly from the upper face 25 and has a central bore 37 oriented transverse to the first and second side edges 33 and 35. A radial split 39 is formed in the ring 17 proximate to the inner edge 29 of the primary mounting platform 15.

The lever arm 19 extends outwardly from the split ring 17 just above the split 39 and includes a vertical flange 41 having upper and lower edges 43 and 45 respectively. The lever arm 19 further includes a pair of triangular gussets 49 positioned on opposed sides of the flange 41 proximate the lower edge 45. The secondary mounting platform 23 is formed on the lower edge 45 of the flange 41 proximate the distal end 21.

Figure 5:
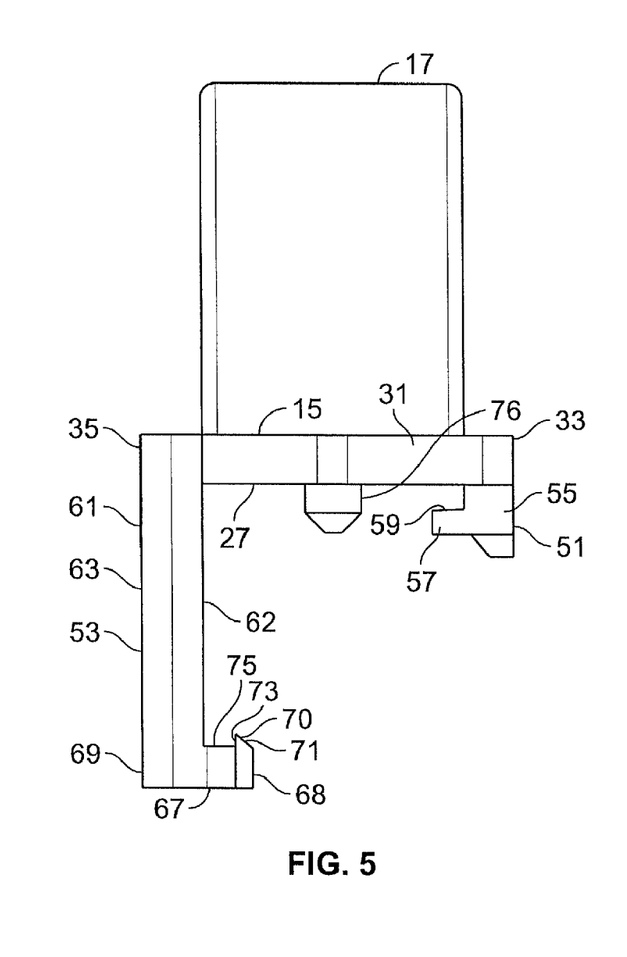
FIG. 5 is a right side elevational view of the clamp of FIG. 2.

The mounting structure 24 for the primary mounting platform 15 includes a short clip 51 and a long clip 53, as best seen in FIG. 5. The short clip 51 is mounted on the lower face 27 of the primary mounting platform 15 proximate the first side edge 33 thereof and includes a first flange 55 which extends outwardly from the platform 15 and is oriented generally perpendicular to the lower face 27 and a second flange 57 which extends inwardly from the first flange 55. The second flange 57 is spaced from and oriented generally parallel to the lower face 27 of the second flange 57 to form a notch 59 therebetween. The notch 59 is sized to receive an outer edge 11 of one of the bracket flanges 5 or 7.

The long clip 53 is mounted on the lower face 27 of the primary mounting platform 15 proximate the second side edge 35 thereof and includes a pair of arms 61 (see FIG. 3) which extend outwardly from the platform 15 and are oriented generally perpendicular to the lower face 27. Each arm 61 includes inner and outer faces 62 and 63, and a distal end 65. The arms 61 are of a length selected to extend across the outer face 10 of either of the bracket flanges 5 and 7. A crossbar 67 interconnects the arms 61 at the distal ends 65 thereof and extends generally parallel to the lower face 27 of the platform 15. The crossbar 67 includes inner and outer edges 68 and 69, respectively. An elongate barb 70 is formed on the crossbar 67 proximate the inner edge 68 thereof and includes an inwardly tapered outer edge 71 and a square inner edge 73. The inner edge 73 is spaced from and oriented generally parallel to the inner faces 62 of the arms 61 to form a notch 75 therebetween. The notch 75 is sized to receive an outer edge 11 of one of the bracket flanges 5 or 7.

The primary mounting platform 15 may further include a locating pin 76 which extends outwardly from the lower face 27 in position to engage a selected one of the holes 12 in the bracket 3. The locating pin 76 is shown positioned proximate the outer edge 31 of the mounting platform 15, with the outer edge 31 being shown as being generally V-shaped with the locating pin 76 near the apex of the V.

Figure 6:
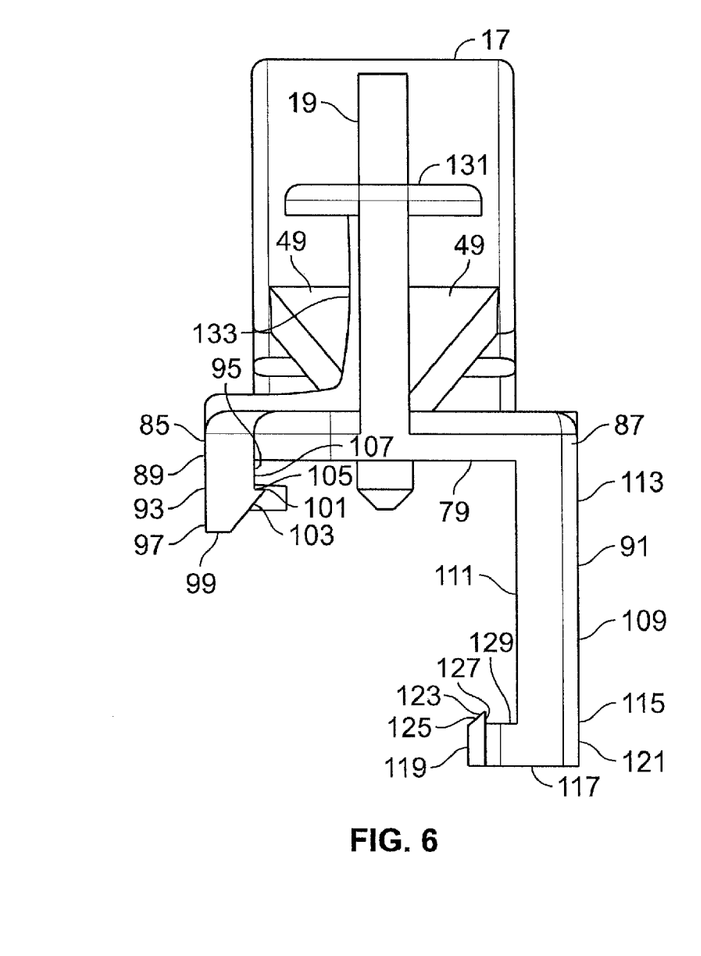
FIG. 6 is a left side elevational view of the clamp of FIG. 2.
Figure 7:
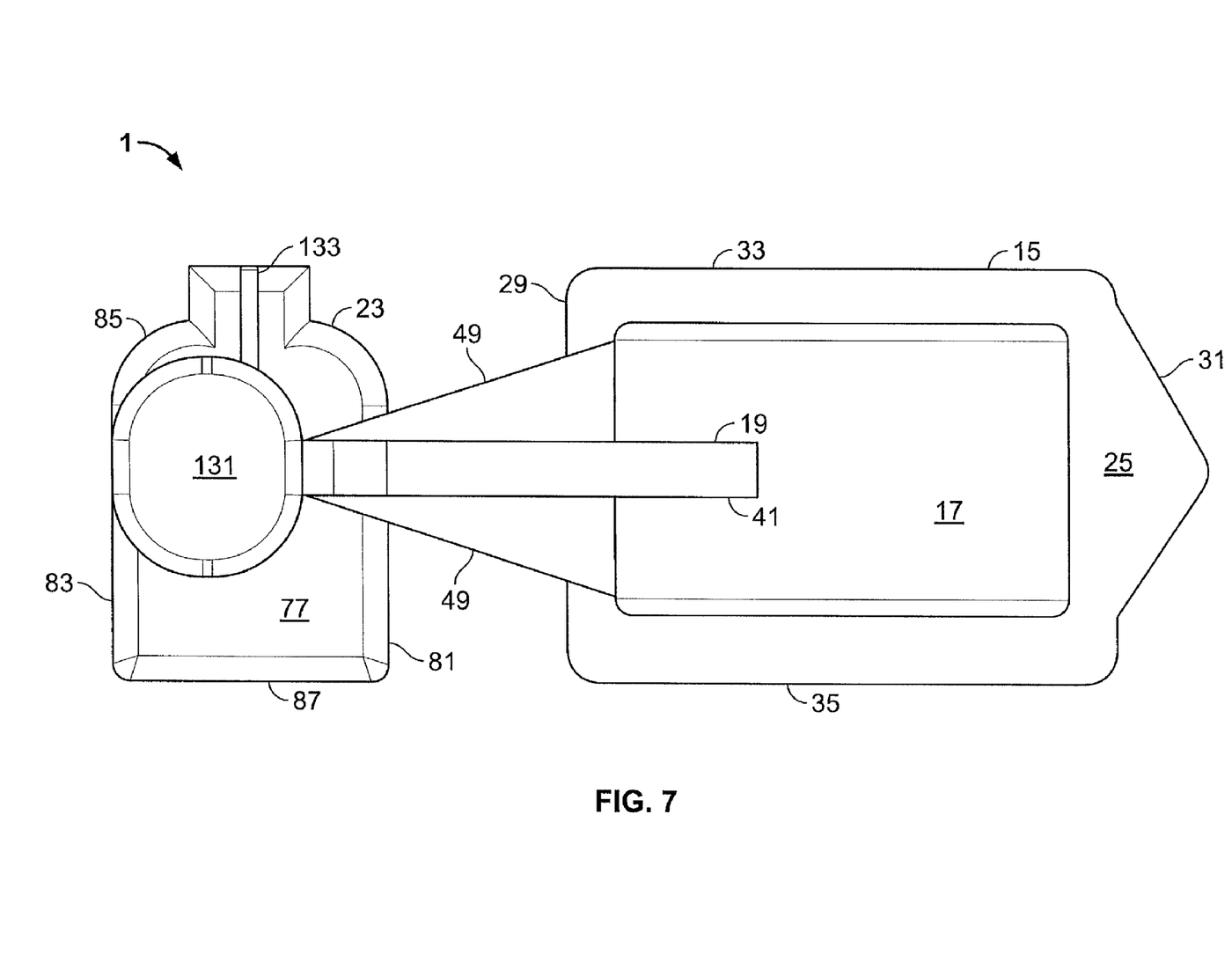
FIG. 7 is a top plan view of the clamp of FIG. 2.
Figure 8:
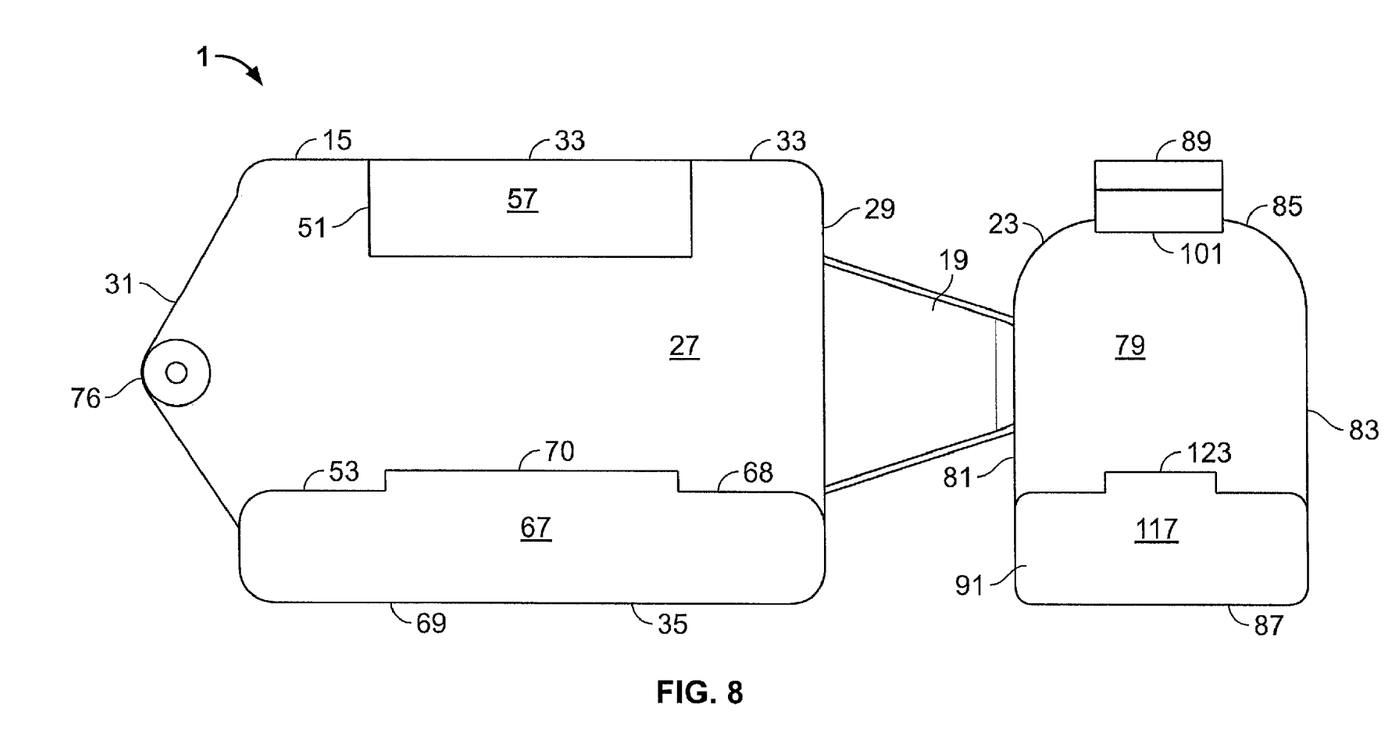
FIG. 8 is a bottom plan view of the clamp of FIG. 2.

The secondary mounting platform 23 includes generally planar upper and lower faces 77 and 79, inner and outer edges 81 and 83, and first and second side edges 85 and 87. Like the mounting structure 24 of the primary mounting platform 15, the mounting structure 24 of the secondary mounting platform 23 also includes a short clip and a long clip, which are designated herein as the short clip 89 and long clip 91 and are best seen in FIG. 6. The short clip 89 is mounted on the lower face 79 of the secondary mounting platform 23 proximate the first side edge 85 thereof and includes a arm 93 which extends outwardly from the platform 23 and is oriented generally perpendicular to the lower face 77. The arm 93 has inner and outer faces 95 and 97, and a distal end 99. A barb 101 is formed on the inner face 95 proximate the distal end 99 and includes a includes an inwardly tapered outer edge 103 and a square inner edge 105. The inner edge 105 is spaced from and oriented generally parallel to the lower face 79 of the secondary mounting platform 23 to form a notch 107 therebetween. The notch 107 is sized to receive an outer edge 11 of one of the bracket flanges 5 or 7.

The long clip 91 is mounted on the lower face 79 of the secondary mounting platform 23 proximate the second side edge 87 thereof and includes a pair of arms 109 (see FIG. 3) which extend outwardly from the platform 23 and are oriented generally perpendicular to the lower face 79. Each arm 109 includes inner and outer faces 111 and 113, and a distal end 115. The arms 109 are of a length selected to extend across the outer face 10 of either of the bracket flanges 5 and 7. A crossbar 117 interconnects the arms 109 at the distal ends 115 thereof and extends generally parallel to the lower face 79 of the platform 23. The crossbar 117 includes inner and outer edges 119 and 121, respectively. An elongate barb 123 is formed on the crossbar 117 proximate the inner edge 119 thereof and includes an inwardly tapered outer edge 125 and a square inner edge 127. The inner edge 127 is spaced from and oriented generally parallel to the inner faces 111 of the arms 109 to form a notch 129 therebetween. The notch 129 is sized to receive an outer edge 11 of one of the bracket flanges 5 or 7.

Referring again to FIGS. 2 and 3, a push tab 131 is formed on the upper side of the lever arm 19 opposite the secondary mounting platform 23. A reinforcing rib 133 (see FIG. 6) may be formed from the short clip 89 to the push tab 131 across the upper face 77 of the secondary mounting platform 23 and along the respective side face of the vertical flange 41 of the lever arm 19. The rib 133 primarily acts to strengthen the short clip 89 to prevent it from breaking off of the secondary mounting platform 23.

In use, the clamp 1 is mounted on the bracket 3 by first inserting an edge 11 of one of the bracket flanges 5 or 7 into the notch 59 of the short clip 51 on the primary mounting platform 15. The locating pin 76 is then aligned with one of the holes 12 in the same bracket flange 5 or 12. The barb 70 on the long clip 53 can then be snapped over the edge 11 on the other bracket flange 5 or 7, thereby securing the primary mounting platform 15 to the bracket 3.

Figure 9:
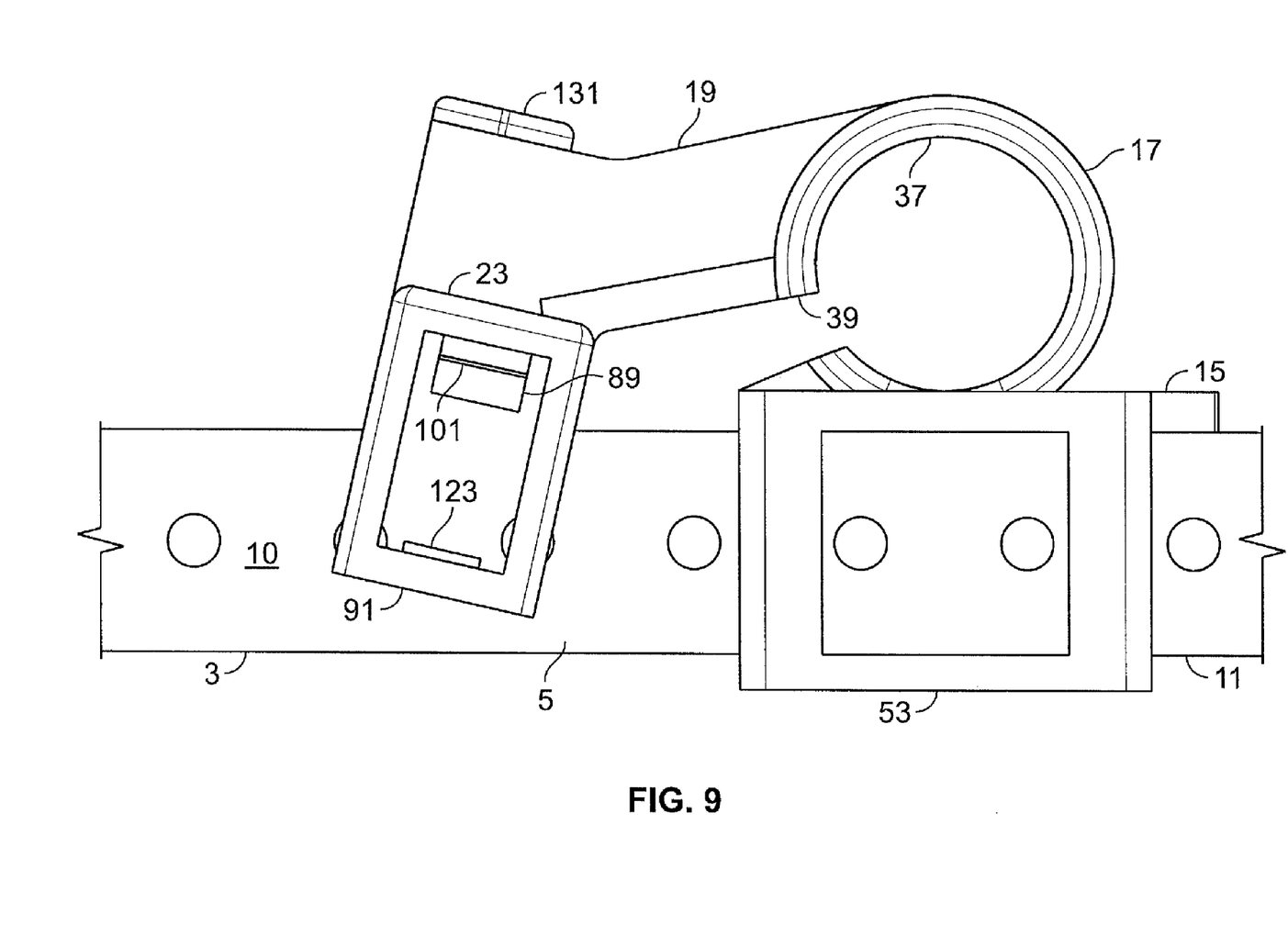
FIG. 9 is a front elevational view of the clamp of FIG. 2 showing the clamp partially mounted on an angle bracket with a split ring of the clamp in a relaxed state before attachment of a secondary mounting platform of the clamp to the bracket.

With the primary mounting platform 15 mounted on the bracket 3, but the secondary mounting platform 23 as yet unconnected, as shown in FIG. 9, the split ring 17 will be in a relaxed state which allows a tube 2 to be inserted through the split ring 17. With the split ring 17 in its relaxed state, the secondary mounting platform 23 will be spaced outwardly from the bracket flange 5 or 7 on which the primary mounting platform 15 is mounted. Once the tube 2 is inserted, the secondary mounting platform 23 may be fastened to the bracket 3 by pressing inwardly on the push tab 131. This will cause the barbs 101 and 123 to snap over the edges 11 of the bracket flanges 5 and 7 to secure the secondary mounting platform 123 to the bracket 3, and simultaneously to reduce the diameter of the split ring 17 to cinch the split ring 17 around the tube 2 to retain the tube 2 in position relative to the bracket 3.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

What is claimed is:

1. A clamp for attaching a tube to an angle bracket having first and second longitudinal bracket flanges, each of the bracket flanges having inner and outer faces and an outer edge, said clamp comprising:
   a) a primary mounting platform;
   b) a split ring on said mounting platform, said split ring having a bore for receiving the tube;
   c) means for mounting said primary mounting platform against the outer face of either the first bracket flange or the second bracket flange; said means for mounting said primary mounting platform comprising first and second clips extending outwardly from said primary mounting platform, wherein
      i) said first clip is a short clip sized to receive the outer edge of the one of the first and second bracket flanges against which said primary mounting platform is to be mounted, and
      ii) said second clip is a long clip including an arm having a length selected to extend across the outer face of the one of the first and second bracket flanges against which said primary mounting platform is not to be mounted, and a barb connected to said arm proximate a distal end thereof for engaging the outer edge of the respective bracket flange; and
   d) means for cinching said split ring against a tube extending through said bore.

2. The clamp as in claim 1 wherein said barb includes an inwardly tapered outer edge and a square inner edge, said inner edge being spaced from and oriented generally parallel to an inner face of said arm to form a notch therebetween, said notch being sized to receive the outer edge of the one of the first and second bracket flanges against which said primary mounting platform is not to be mounted.

3. The clamp as in claim 1 wherein said means for mounting said primary mounting platform further includes a locating pin extending outwardly from said primary mounting platform, said locating pin being positioned to be received in a hole in the one of the first and second bracket flanges against which said primary mounting platform is to be mounted.

4. The clamp as in claim 1 wherein said means for cinching includes a lever arm extending outwardly from said split ring and connecting means on said lever arm for attaching a distal end of said lever arm to the bracket.

5. The clamp as in claim 4 wherein said connecting means comprises a secondary mounting platform connected to said lever arm proximate said distal end thereof and third and fourth clips extending outwardly from said secondary mounting platform, wherein said third clip is a short clip sized to receive the outer edge of the one of the first and second bracket flanges against which said primary mounting platform is to be mounted, and said fourth clip is a long clip sized to extend across the outer face of the other one of the first and second bracket flanges and engage the outer edge thereof.

6. The clamp as in claim 5 wherein each of said third and fourth clips includes an arm extending outwardly from said secondary mounting platform and a barb connected to the respective arm proximate a distal end thereof.

7. The clamp as in claim 6 wherein each said barb includes an inwardly tapered outer edge and a square inner edge, each said inner edge being spaced from and oriented generally parallel to an inner face of the respective arm to form a notch therebetween, each said notch being sized to receive the outer edge of the respective one of the bracket flanges.

8. The clamp as in claim 4 and further including a push tab mounted on said lever arm opposite said connecting means.

9. A clamp for attaching a tube to an angle bracket having first and second longitudinal bracket flanges, each of the bracket flanges having inner and outer faces and an outer edge, said clamp comprising:
   a) a primary mounting platform;
   b) a split ring on said mounting platform, said split ring having a bore for receiving said tube;
   c) a lever arm extending outwardly from split ring;
   d) a secondary mounting platform formed on said lever arm proximate a distal end thereof;
   e) means for mounting said primary mounting platform against the outer face of either the first bracket flange or the second bracket flange; and
   f) connecting means for attaching said secondary mounting platform to said bracket.

10. The clamp as in claim 9 wherein said means for mounting said primary mounting platform comprises first and second clips extending outwardly from said primary mounting platform, wherein said first clip is a short clip sized to receive the outer edge of the one of the first and second bracket flanges against which said primary mounting platform is to be mounted, and said second clip is a long clip sized to extend across the outer face of the other one of the first and second bracket flanges and engage the outer edge thereof.

11. The clamp as in claim 10 wherein said second clip includes an arm having a length selected to extend across the outer face of the one of the first and second bracket flanges against which said primary mounting platform is not to be mounted, and a barb connected to said arm proximate a distal end thereof.

12. The clamp as in claim 11 wherein said barb includes an inwardly tapered outer edge and a square inner edge, said inner edge being spaced from and oriented generally parallel to an inner face of said arm to form a notch therebetween, said notch being sized to receive the outer edge of the one of the first and second bracket flanges against which said primary mounting platform is not to be mounted.

13. The clamp as in claim 11 wherein said means for mounting said primary mounting platform further includes a locating pin extending outwardly from said primary mounting platform, said locating pin being positioned to be received in a hole in the one of the first and second bracket flanges against which said primary mounting platform is to be mounted.

14. The clamp as in claim 9 wherein said connecting means comprises third and fourth clips extending outwardly from said secondary mounting platform, wherein said third clip is a short clip sized to receive the outer edge of the one of the first and second bracket flanges against which said primary mounting platform is to be mounted, and said fourth clip is a long clip sized to extend across the outer face of the other one of the first and second bracket flanges and engage the outer edge thereof.

15. The clamp as in claim 14 wherein each of said third and fourth clips includes an arm extending outwardly from said secondary mounting platform and a barb connected to the respective arm proximate a distal end thereof.

16. The clamp as in claim 15 wherein each said barb includes an inwardly tapered outer edge and a square inner edge, each said inner edge being spaced from and oriented generally parallel to an inner face of the respective arm to form a notch therebetween, each said notch being sized to receive the outer edge of the respective one of the bracket flanges.

17. The clamp as in claim 9 and further including a push tab mounted on said lever arm opposite said secondary mounting platform.

18. A clamp for attaching a tube to either bracket flange of an angle bracket having first and second longitudinal bracket flanges, each of the bracket flanges having inner and outer faces and an outer edge, said clamp comprising:

a) a primary mounting platform;
b) a split ring on said mounting platform, said split ring having a bore for receiving the tube;
c) first and second clips extending outwardly from said primary mounting platform, wherein said first clip is a short clip sized to receive the outer edge of the one of the first and second bracket flanges against which said primary mounting platform is to be mounted, and said second clip is a long clip sized to extend across the outer face of the other one of the first and second bracket flanges and engage the outer edge thereof;
d) a lever arm extending outwardly from said split ring;
e) a secondary mounting platform formed on said lever arm proximate a distal end thereof;
f) third and fourth clips extending outwardly from said secondary mounting platform, wherein said third clip is a short clip sized to receive the outer edge of the one of the first and second bracket flanges against which said primary mounting platform is to be mounted, and said fourth clip is a long clip sized to extend across the outer face of the other one of the first and second bracket flanges and engage the outer edge thereof.

19. The clamp as in claim 18 wherein said second and fourth clips each includes an arm having a length selected to extend across the outer face of the one of the first and second bracket flanges against which said primary mounting platform is not to be mounted and a barb connected to the respective arm proximate a distal end thereof.

20. The clamp as in claim 19 wherein each said barb includes an inwardly tapered outer edge and a square inner edge, each said inner edge being spaced from and oriented generally parallel to an inner face of the respective arm to form a notch therebetween, each said notch being sized to receive the outer edge of the one of the first and second bracket flanges against which said primary mounting platform is not to be mounted.

21. The clamp as in claim 20 wherein said third clip includes an arm and a barb connected to the respective arm proximate a distal end thereof, said barb including an inwardly tapered outer edge and a square inner edge, said inner edge being spaced from and oriented generally parallel to an inner face of said arm to form a notch therebetween, said notch being sized to receive the outer edge of the one of the first and second bracket flanges against which said primary mounting platform is to be mounted.

22. The clamp as in claim 18 and further including a locating pin extending outwardly from said primary mounting platform, said locating pin being positioned to be received in a hole in the one of the first and second bracket flanges against which said primary mounting platform is to be mounted.

23. The clamp as in claim 18 and further including a push tab mounted on said lever arm opposite said secondary mounting platform.

* * * * *